US010301011B2

(12) United States Patent
Strauss et al.

(10) Patent No.: US 10,301,011 B2
(45) Date of Patent: *May 28, 2019

(54) ELECTRIFIED ROTORCRAFT

(71) Applicant: Sikorsky Aircraft Corporation, Stratford, CT (US)

(72) Inventors: Michael Peter Strauss, New Haven, CT (US); Mark Denton Bystry, Jr., Stratford, CT (US); Michael Joseph DeVita, Cos Cob, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 52 days.

This patent is subject to a terminal disclaimer.

(21) Appl. No.: 14/811,186

(22) Filed: Jul. 28, 2015

(65) Prior Publication Data

US 2016/0083085 A1 Mar. 24, 2016

Related U.S. Application Data

(63) Continuation of application No. 14/046,377, filed on Oct. 4, 2013, now Pat. No. 9,169,027.

(51) Int. Cl.
*B64C 27/12* (2006.01)
*B64D 35/00* (2006.01)
(Continued)

(52) U.S. Cl.
CPC .............. *B64C 27/12* (2013.01); *B64C 27/14* (2013.01); *B64D 31/00* (2013.01); *B64D 35/00* (2013.01); *B64D 2027/026* (2013.01)

(58) Field of Classification Search
CPC combination set(s) only.
See application file for complete search history.

(56) References Cited

U.S. PATENT DOCUMENTS 4,554,989 A 11/1985 Gruich et al.
6,293,491 B1 9/2001 Wobben
(Continued)

FOREIGN PATENT DOCUMENTS

WO 2011144690 A1 11/2011
WO 2011144692 A2 11/2011

OTHER PUBLICATIONS

Non-Final Office Action for U.S. Appl. No. 14/046,377 dated Sep. 29, 2014, 13 pages.

*Primary Examiner* — Hussein Elchanti
(74) *Attorney, Agent, or Firm* — Cantor Colburn LLP

(57) ABSTRACT

An electrified propulsion system for a rotary wing aircraft includes a flight control computer that receives a signal indicative of a power demand on an engine; an engine control system that is in communication with the engine and is configured to control operation of the engine at a selected operating point; a generator that is in mechanical communication with the engine and is configured to receive mechanical power from the engine and convert the mechanical power to electrical power; an electric motor that is in electrical communication with the generator and is configured to receive the electric power; and a rotor that is in mechanical communication with the electric motor; wherein the electric motor is configured to control rotation and provide the mechanical power demand of the rotor at the selected operating point in response to the received signal.

10 Claims, 5 Drawing Sheets

(51) Int. Cl.
    *B64D 31/00*     (2006.01)
    *B64C 27/14*     (2006.01)
    *B64D 27/02*     (2006.01)

(56) References Cited

U.S. PATENT DOCUMENTS

| | | | |
|---|---|---|---|
| 9,169,027 B2 * | 10/2015 | Strauss | B64D 35/00 |
| 9,248,908 B1 * | 2/2016 | Luyks | B64C 27/12 |
| 2006/0042846 A1 | 3/2006 | Kojori et al. | |
| 2010/0048349 A1 | 2/2010 | Yang | |
| 2010/0126178 A1 | 5/2010 | Hyde et al. | |
| 2011/0100014 A1 | 5/2011 | Hyde et al. | |
| 2011/0121127 A1 * | 5/2011 | Certain | B64C 27/12 |
| | | | 244/17.19 |
| 2013/0049364 A1 | 2/2013 | Teets et al. | |
| 2013/0147204 A1 * | 6/2013 | Botti | B64D 27/24 |
| | | | 290/1 A |
| 2014/0117148 A1 * | 5/2014 | Dyrla | B64C 27/14 |
| | | | 244/17.13 |

* cited by examiner

ELECTRIFIED ROTORCRAFT

CROSS-REFERENCE TO RELATED APPLICATION

This application is a continuation of U.S. patent application Ser. No. 14/046,377, filed Oct. 4, 2013, the entire contents of which are incorporated herein by reference.

BACKGROUND

The subject matter disclosed herein relates generally to propulsion systems and to, in particular, a rotary wing aircraft having an electrified propulsion system.

Rotary wing aircraft utilize propulsion systems to power aircraft flight. These propulsion systems convert stored energy into mechanical work to drive one or more rotor systems for flight. Energy (typically stored in chemical form as fuel) is supplied to an energy conversion device (typically a plurality of internal combustion engines such as a turbine engine, spark ignition engine, or compression ignition engine), which converts the energy into mechanical work. A drive system transmits mechanical work through a plurality of transmission mechanisms (e.g., main rotor gearbox(es), a tail rotor gearbox, auxiliary propulsor gearbox(es), drive shafts, drive couplings, etc.) to drive the rotary wing aircraft's thrust generating rotors. As these mechanical transmission devices transmit mechanical power from the rotorcraft engines along a chain of components, they experience a large number of fatigue cycles. Each component designed for fatigue life is typically overdesigned to meet the component life requirement, which adds weight to the component. Each component in the chain that physically engages another such as, e.g., gears and bearings, generates heat from friction and requires lubrication to minimize friction losses and a cooling system to reject heat. Lubrication and cooling systems add weight to the conventional rotorcraft. Additionally, these mechanical transmission devices must also be supported by strengthened airframe structure which further increases vehicle weight. To change the direction of the mechanical transmission, angled bevel gears requiring thrust force reaction are needed. This thrust force reaction along the gear requires additional weight from bearings, shafts and housing structure.

Additionally, electricity for supplying the aircraft's electrical load may be supplied through a plurality of generators which are mounted to the main rotor gearbox(es) or engine(s). For a typical aircraft, the energy demand of the engine differs depending on the flight segment such as steady/level flight, take off, vertical landing, hover, or during emergency conditions, etc. As a result, the engine may not operate near its peak efficiency during off-design point power conditions. For missions where the rotorcraft demand is mostly for the off-design point power segment of flight, the rotorcraft may generally exhibit lower efficiency. A propulsion system for a rotary wing aircraft that provides optimal operating efficiency of the engine would increase the fuel efficiency of the vehicle and provide greater value to the operator of the aircraft. Furthermore, a propulsion system that reduces mechanical complexity would also decrease total vehicle weight, improve its reliability and reduce its maintenance burden to provide greater value to the operator of the aircraft.

BRIEF SUMMARY

An exemplary embodiment includes an electrified propulsion system for a rotary wing aircraft having a flight control computer that receives a signal indicative of a power demand on an engine; an engine control system that is in communication with the engine and is configured to control operation of the engine at a selected operating point; a generator that is in mechanical communication with the engine and is configured to receive mechanical power from the engine and convert the mechanical power to electrical power; an electric motor that is in electrical communication with the generator and is configured to receive the electric power; and a rotor that is in mechanical communication with the electric motor, whereby the electric motor is configured to control rotation and provide the mechanical power demand of the rotor at the selected operating point in response to the received signal.

Another exemplary embodiment includes a method for controlling a propulsion system for a rotary wing aircraft including receiving by a flight control computer a signal indicative of a power demand on an engine; determining by the flight control computer that a battery is available to supply electrical power to an electrical load in response to the power demand; supplying by a generator the electrical power upon determining that the battery is not available to supply the electrical power; determining by the flight control computer in communication with a power processing unit that the battery has stored electrical power in response to determining that the battery is available; and supplying by the battery the stored electrical power for the power demand in response to the determining that the battery has the stored electrical power.

Other aspects, features, and techniques will become more apparent from the following description taken in conjunction with the drawings.

BRIEF DESCRIPTION OF THE SEVERAL VIEWS OF THE DRAWINGS

The foregoing and other features, and advantages of embodiments are apparent from the following detailed description taken in conjunction with the accompanying drawings in which like elements are numbered alike in the several FIGURES.

DETAILED DESCRIPTION

Figure 1:
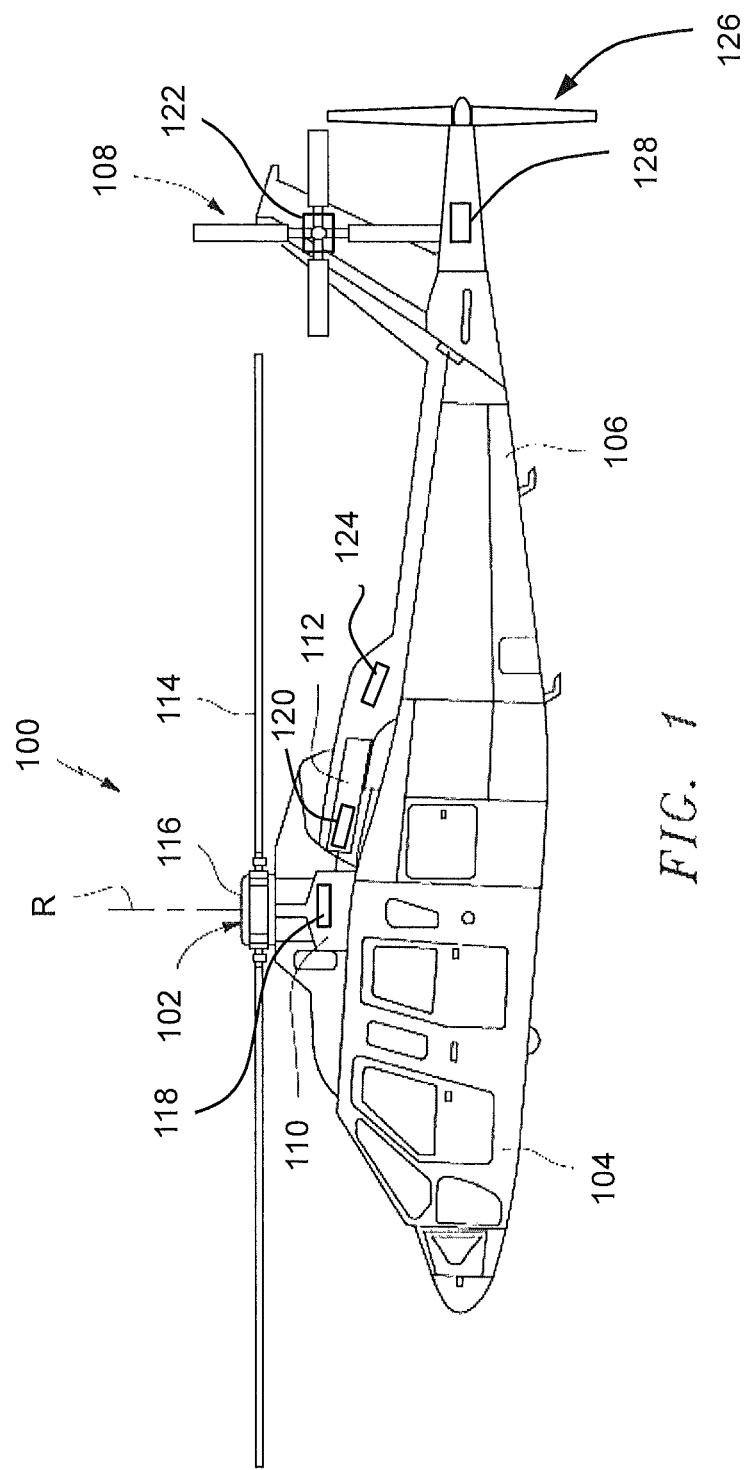
FIG. 1 depicts a rotary wing aircraft in an exemplary embodiment.

FIG. 1 schematically illustrates an electrified rotary wing aircraft 100 which includes an electrified propulsion system according to an embodiment. As illustrated, the electrified rotary wing aircraft 100 includes an airframe 104 having a main rotor assembly 102 and an extending tail 106 which mounts an anti-torque system, such as a tail rotor system 108. In an embodiment, the rotary wing aircraft 100 may include an auxiliary propulsor rotor 126 that provides translational thrust augmentation to the main rotor assembly 102. Although one auxiliary propulsor rotor 126 is depicted in FIG. 1, additional auxiliary propulsor rotors may be provided in embodiments. The main rotor assembly 102 includes a plurality of rotor blades 114 mounted to a rotor hub 116. In an embodiment, the main rotor assembly 102 is mechanically connected to an electric motor (illustrated schematically at 118). The electric motor 118 receives electricity from one or more generators (illustrated schematically at 120), which are driven mechanically by one or more internal combustion engines 112 (also referred to as powerplant 202 in FIG. 2). The electric motor 118 in turn drives the main rotor assembly 102 about an axis of rotation R. In another embodiment, the main rotor assembly 102 may be driven by a speed reducing gearbox (illustrated schematically at 110) that may be mechanically coupled to the electric motor 118 in order to provide a required revolution-per-minute (RPM) of the main rotor assembly 102 relative to the RPM of the electric motor 118.

In embodiments, electricity may be used to power electrical and mechanical flight controls such as, for example, individual blade control (IBC) servos, hydraulic actuators, aircraft power, etc. Driving the main rotor assembly 102 transmits mechanical work through the rotor hub 116 in order to drive the blades 114 and to provide the electrified rotary wing aircraft 100 with flight-enabling lift. Also, the tail rotor system 108 and the auxiliary propulsor rotor 126 may be driven by electric motors (illustrated schematically at 122 and 128, respectively) that are coupled to one or more generators (illustrated schematically at 120). The electric generator 120 may provide electricity to the control system of tail rotor system 108 and the auxiliary propulsor rotor 126 through electro-mechanical actuators for controlling one or more IBC servos (not shown). In an embodiment, a speed reducing gearbox may be mechanically coupled to the electric motor 122 to drive the tail rotor system 108 at the required revolution-per-minute (RPM) of the tail rotor assembly 108 relative to the RPM of the electric motor 122; similarly, one or more speed reducing gearboxes may be mechanically coupled to the electric motor 128 to drive the auxiliary propulsor rotor 126 at the required revolution-per-minute (RPM) of auxiliary propulsor assembly 126 relative to the RPM of the electric motor 128. It is to be appreciated that, in embodiments, the electrified rotary wing aircraft 100 may include additional internal combustion engines, electric motors, and generators as needed in order to provide the electrified propulsion system. Additionally, each auxiliary propulsor rotor 126 may be driven by one or more electric motors 128 through one or more speed reducing gearboxes. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments.

It is to be appreciated that the electrified rotary wing aircraft 100 provides substantial benefits over conventional rotary wing aircraft. Particularly, the complexity and/or maintenance burden of the electrified rotary wing aircraft 100 is reduced while increasing the reliability of the overall system. Coupling the one or more internal combustion engines 112 directly to the generators 120 enables the rotary wing aircraft 100 to drive main rotor 102, tail rotor 108 and the auxiliary propulsor rotor 126 through their respective electric motors (118, 122, 128) without utilizing mechanical transmission devices such as large gearboxes, shafts, and couplings as are found in conventional rotary wing aircraft. The mechanical transmission devices in the electrified rotary wing aircraft 100 may be limited only to parallel axis reduction gearboxes. The parallel axis reduction gearboxes enable the electric motor output speeds to be optimized; and reduction in the associated structure required to support the mechanical transmission of power from the electric motors 118, 122, and 128 to the respective rotor hubs 116, 108, and 126. The parallel axis gearboxes (i.e., gearing systems wherein the input and output drivetrain are on parallel axes and can be in-line or offset) may utilize spur gears and double-helical gears that avoid thrust forces and therefore save additional weight.

In another embodiment, a battery (illustrated schematically at 124) may be in electrical communication with the electric motors 118, 122, and 128 as well as one or more electric generators 120. The addition of battery 124 to the electrified rotary wing aircraft 100 provides an additional benefit over conventional rotary wing aircraft by enabling the internal combustion engines 112 to be run at optimal operating points across different flight regimes, e.g., hover, ascending, or descending, where they attain increased fuel efficiency. This engine operation is made possible by supplementing energy from electricity stored in battery 124 during higher power demand and recharging the electricity stored in battery 124 during lower power demand. Other benefits may include improved handling qualities and aircraft response to transient conditions or providing for additional rotor drive power to main rotor assembly 102 as will be discussed below with reference to FIGS. 3 and 4.

Figure 2:
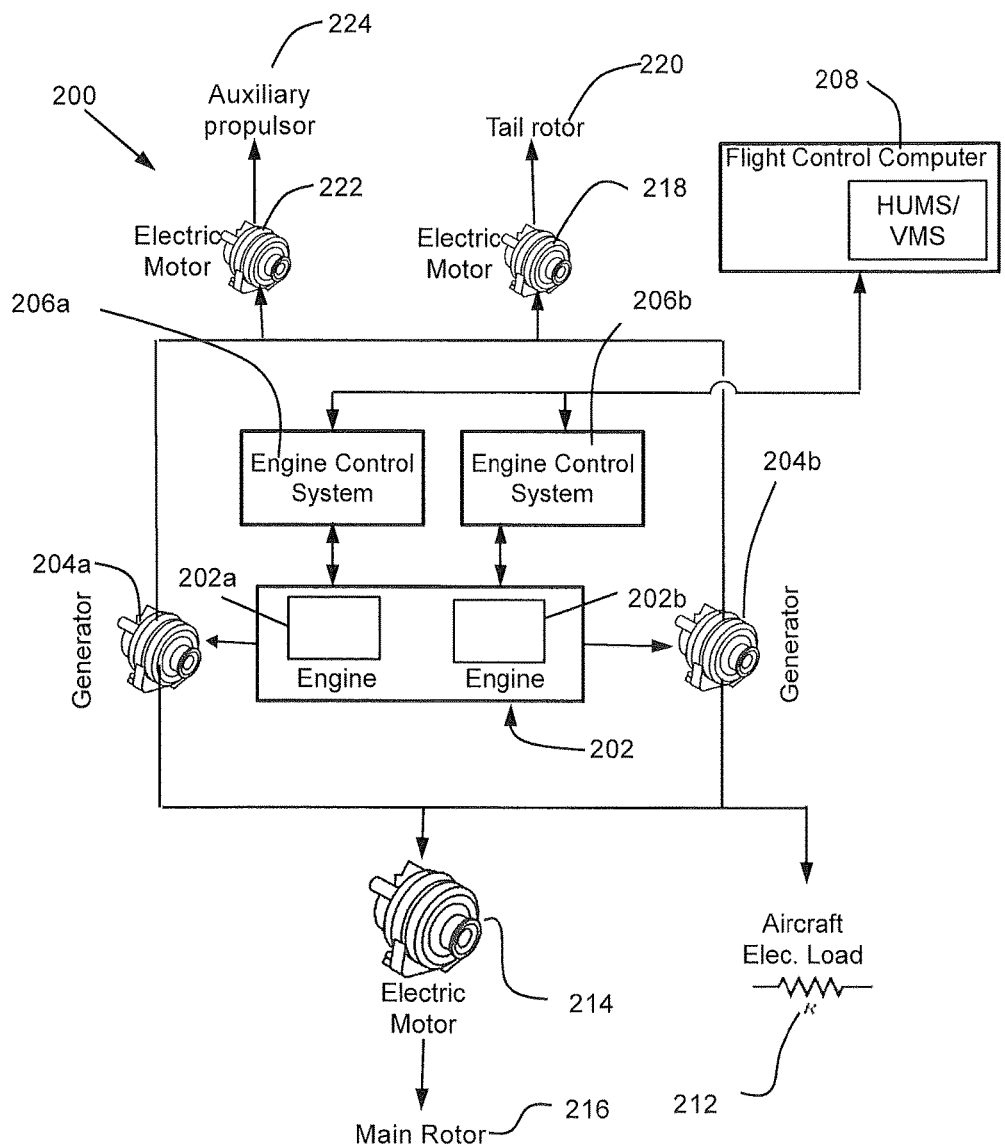
FIG. 2 depicts an electrified propulsion system for a rotary wing aircraft in an exemplary embodiment.

FIG. 2 depicts a schematic view of an electrified propulsion system 200 for the electrified rotary wing aircraft 100 (See FIG. 1) in an exemplary embodiment. As illustrated, the electrified propulsion system 200 includes one or more internal combustion engines 202a, 202b (collectively referred to as "powerplant 202") that are mechanically coupled to respective electric generators 204a, 204b. In embodiments, the internal combustion engines 202a, 202b may include a turbine engine, spark ignition engine, or compression ignition engine. Although two internal combustion engines 202a, 202b are shown for powerplant 202, additional internal combustion engines or a single engine may be provided in other embodiments. Each engine 202a, 202b in powerplant 202 mechanically drives a respective generator 204a, 204b in order to convert mechanical energy from the powerplant 202 into electrical energy. In embodiments, additional and substantially similar generators or a single generator may be coupled to the internal combustion engines 202a, 202b.

Also illustrated, the electrified propulsion system 200 includes a flight control computer (FCC) 208 that is in communication with engine control systems (ECS) 206a, 206b such as Full Authority Engine Digital Controllers (FADEC) for internal combustion engines 202a and 202b respectively. The FCC 208 receives commands to provide electricity to the electric motors 214, 218, and 222 and will therefore send commands to ECSs 206a and 206b to provide engine power. In an embodiment, the FCC 208 may include a vehicle management system (VMS) and a health usage monitoring system (HUMS). The HUMS collects operational flight data utilizing on-board accelerometers, sensors, and avionics systems in order to monitor the health of components on the electrified rotary wing aircraft 100 (See FIG. 1). The FCC 208 may include memory to store instructions that are executed by a processor. The executable instructions may be stored or organized in any manner and at any level of abstraction, such as in connection with managing the power flow through the electrified propulsion system 200. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored the data and control algorithms for controlling the internal combustion engines 202a-202b, the electric motors 214, 218, and other operational data for the electrified rotary wing aircraft 100 (FIG. 1).

Embodiments described above enable the main rotor 216, tail rotor 220, and the auxiliary propulsor rotor 224 to be driven by electric motors 214, 218, and 222 respectively while the engines 202a-202b drive the generators 204a-204b to provide power to the system. In an embodiment, the electricity from the generators 204a-204b is provided to electric motors 214, 218, and 222 and is dependent of the electricity generated by the powerplant 202. Electric power from the generators 204a and 204b to the electric motors 214,218, and 222 is transferred through wires which can enable new vehicle architectures unachievable previously using mechanical drive components such as drive shafts and intermediate gearboxes. The location of the powerplant is no longer constrained by the physical connection of the mechanical drive components from the engine outputs to the thrust-generating rotors. The structural loads to support the rotor system may be reduced because it will no longer have to maintain a required alignment of mechanical drive components or support the weight of the mechanical drive components.

Figure 3:
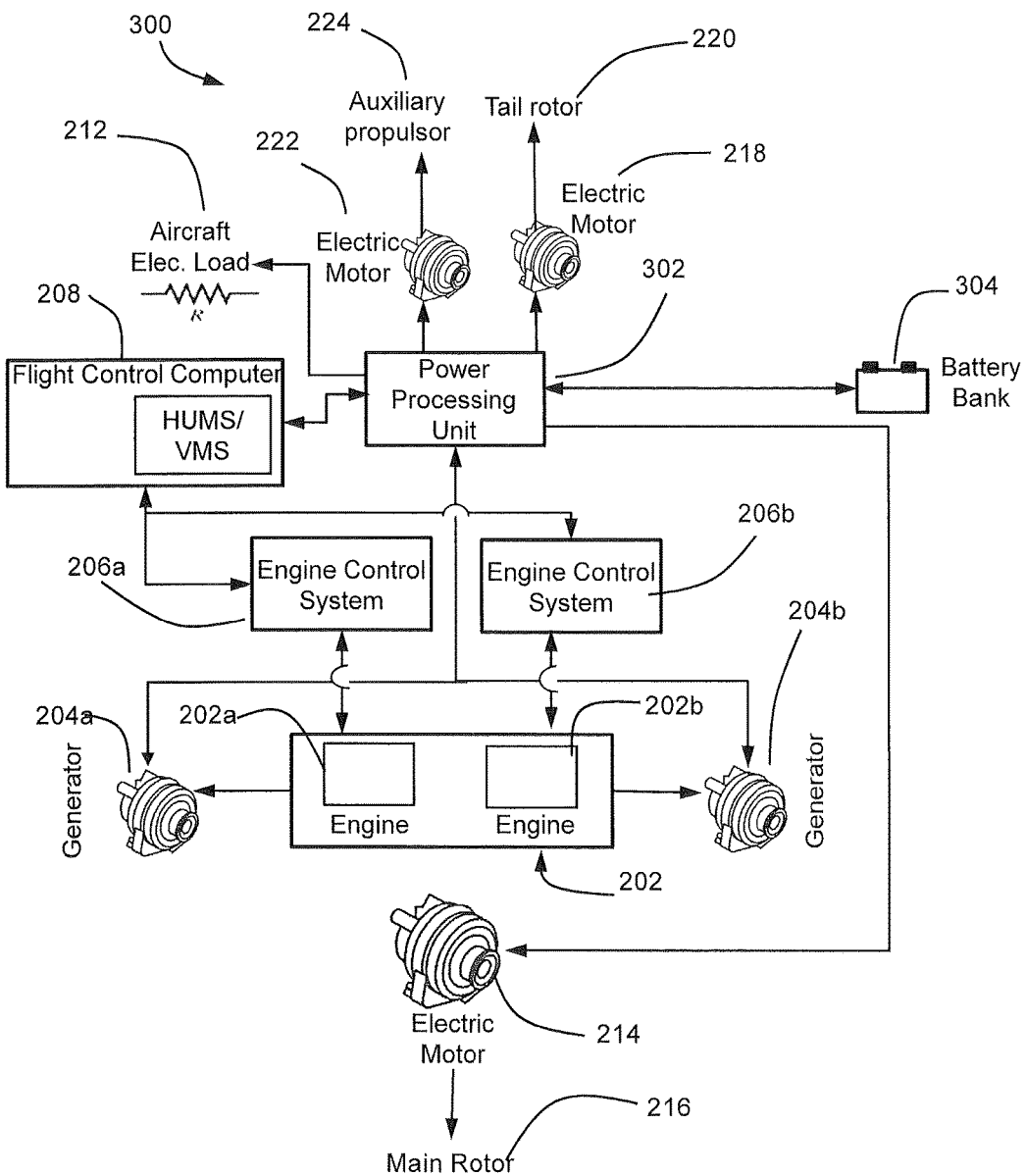
FIG. 3 depicts an electrified propulsion system for a rotary wing aircraft in an exemplary embodiment.

FIG. 3 depicts a schematic view of an electrified propulsion system 300 for the electrified rotary wing aircraft 100 (See FIG. 1) in an exemplary embodiment. As shown, the electrified propulsion system 300 includes one or more internal combustion engines 202a, 202b (collectively referred to as "powerplant 202") that are mechanically coupled to respective electric generators 204a, 204b. In embodiments, the internal combustion engines 202a, 202b may include a turbine engine, spark ignition engine, or compression ignition engine. Although two internal combustion engines 202a, 202b are shown for powerplant 202, additional internal combustion engines or a single engine may be provided in other embodiments. Each engine 202a, 202b in powerplant 202 may be coupled to a respective generator 204a, 204b in order to convert mechanical energy from the powerplant 202 into electrical energy. In embodiments, additional and substantially similar generators may be coupled to the internal combustion engines 202a, 202b. The powerplant 202 releases mechanical energy via shafts to the generators 204a, 204b to create electrical energy.

Also shown in FIG. 3, the electrified propulsion system 300 includes a power processing unit (PPU) 302 that is electrically connected to the generators 204a, 204b. Particularly, the PPU 302 receives electricity from the generators 204a, 204b and distributes the electricity for various needs, for example, to aircraft electrical load 212, to electric motor 214 which drives a main rotor 216, to electric motor 218 which drives a tail rotor 220, to electric motor 222 which drive the auxiliary propulsor rotor 224 and to a battery bank 304. The battery bank 304 may include one or more batteries. In an embodiment, a high voltage system may be utilized for the electrical system in order to optimize the electrified propulsion system 300 for use with high-speed, high revolution-per-minute (RPM) generators. The PPU 302 distributes electricity from battery bank 304 to the aircraft electrical load 212 and to the electric motors 214, 218, and 222 when the demand for electricity exceeds the electricity being produced by generators 204a and 204b such as during high-load maneuvers. The PPU 302 distributes electricity to battery bank 304 for storage when the demand for electricity by the aircraft electric load 212 and electric motors 214, 218 and 222 are less than the electricity being produced by generators 204a and 204b such as during low-load maneuvers or cruise. As such, the PPU 302 distribution of electricity to and from battery bank 304 enables the flight control computer (FCC) 208 to smooth out the load on engines 202a and 202b due to the power requirement of rotors 216, 220 and 224 and aircraft electric load 212. Smoothing out the load on engines 202a and 202b may allow engines 202a and 202b to operate more efficiently.

Similar to the embodiment shown and described in FIG. 2, the electrified propulsion system 300 includes a FCC 208 that is in communication with engine control systems (ECS) 206a and 206b for engines 202a and 202b respectively. The FCC 208 receives commands from the pilot interface and from other vehicle electric loads to provide electric power to the motors 214, 218 and 222 and will therefore send commands to ECSs 206a and 206b to provide power and to the PPU 302 to distribute electricity. In an embodiment, the FCC 208 may include a vehicle management system (VMS) and a health usage monitoring system (HUMS). The HUMS collects operational flight data utilizing on-board accelerometers, sensors, and avionics systems in order to monitor the health of components on the electrified rotary wing aircraft 100 (FIG. 1). The FCC 208 and PPU 302 may each include memory to store instructions that is executed by a processor. The executable instructions may be stored or organized in any manner and at any level of abstraction, such as in connection with managing the power flow through the electrified propulsion system 300. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored the data and control algorithms for controlling the internal combustion engines 202a-202b, the electric motors 214, 218 and 222, and other operational data for the electrified rotary wing aircraft 100 (See FIG. 1).

Embodiments described above enable the main rotor 216, tail rotor 220 and auxiliary propulsor(s) 224 to be driven by an electric motor 214, electric motor 218 and electric motor(s) 222 while the engines 202a-202b drive the generators 204a-204b to provide power to the system 300. In an embodiment, the electricity from the generators 204a-204b and from the battery bank 304 is provided to electric motors 214, 218, and 222 independent of the power output of the powerplant 202. As a result, it is possible for electric motors 214, 218, and 222 to vary the speed and power provided to the main rotor 216, tail rotor 220, and auxiliary propulsor rotor 224 within a broader range of operation while running the powerplant 202 at its continuous steady state design point (where it runs at higher efficiency). As a result, the electrified propulsion system 200 may provide a more optimal use of the fuel (energy). In other embodiments, the internal combustion engines 202a-202b (or powerplant 202) may be run at constant speed and torque to provide constant output power to the generators 204a, 204b while the battery bank 304 may be used to supplement power during momentary increases (i.e., peaks) in rotor system power demand and supplying stored energy back to the battery bank 304 during momentary decreases (i.e., valleys) in rotor system power demand. In an embodiment, the battery bank 304 may be used to supplement high-power demand of the electrified rotary wing aircraft 100 (See FIG. 1) such as, for example, during take-off, landing, climbing, descent, emergency power conditions, or transient or maneuvering power, etc. In this way, the electric motors 214, 218 and 222 supplement power from the internal combustion engines 202a-202b by using additional energy stored in the battery bank 304 and allowing the size of the internal combustion engines 202a-202b to be reduced. In other embodiments when the electrified rotary wing aircraft 100 (FIG. 1) features a relatively smaller battery bank 210 to reduce its weight impact on the vehicle, the powerplant 202 may compensate by operating over a predefined or selected operating range of limiting loads for certain flight conditions, e.g., hover, ascending, descending. A small battery bank 210 may still provide some level of optimization of the electrified propulsion system 300 by supplementing electric power to the electric motors 214, 218 and 222 when the rotary wing aircraft 100 (FIG. 1) requires more power during transient flight conditions.

Figure 4:
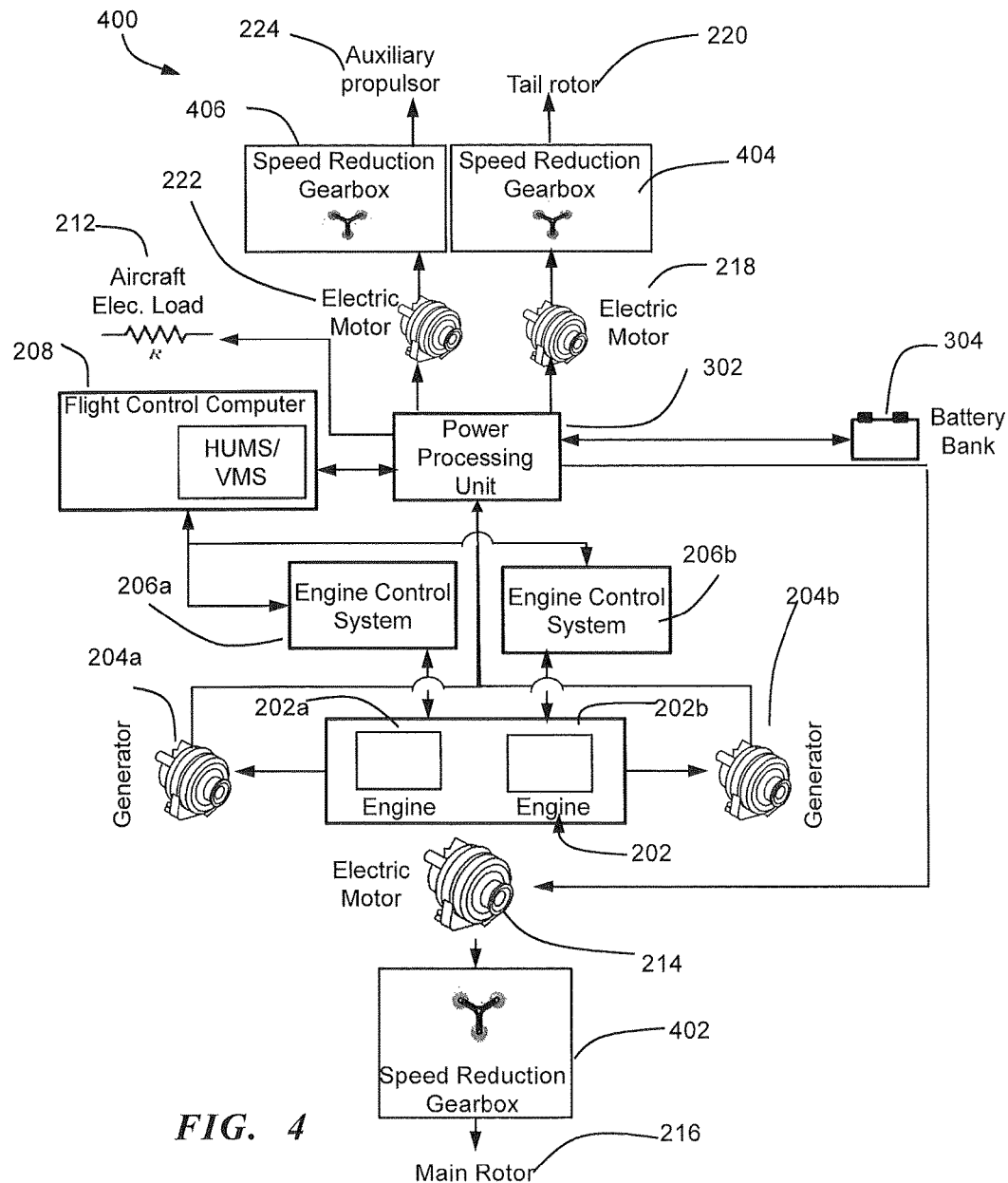
FIG. 4 depicts an electrified propulsion system for a rotary wing aircraft in an exemplary embodiment.

FIG. 4 depicts a schematic view of another embodiment of an electrified propulsion system 400 that includes electric motors 214, 218, and 222 which are coupled to respective speed reduction gearboxes 402, 404 and 406 while all other features are substantially similar to the propulsion system described in reference to FIG. 2. As illustrated, propulsion system 400 includes one or more internal combustion engines 202a, 202b (collectively referred to as "powerplant 202"), which are mechanically coupled to a plurality of generators 204a, 204b. In an embodiment, powerplant 202 includes two internal combustion engines 202a, 202b that are mechanically coupled to respective generators 204a, 204b. The powerplant 202 releases mechanical energy to the generators 204a, 204b which is converted into electrical energy by the generators 204a, 204b.

Further shown in FIG. 4, the electrified propulsion system 400 includes a power processing unit (PPU) 302 that is electrically connected to the generators 204a, 204b. Particularly, the PPU 302 receives electricity from the generators 204a, 204b and distributes the electricity for various needs, for example, to the aircraft electrical load 212, to electric motor 214 which drives a main rotor 216 through speed reduction gearbox 402, to electric motor 218 which drives a tail rotor 220 through speed reduction gearbox 404, to electric motor 222 which drive auxiliary propulsor rotor (s) 224 through one or more speed reduction gearbox(es) 406 and to a battery bank 304. In an embodiment, a high voltage system may be utilized for the electrical system in order to optimize the electrified propulsion system 400 for use with high-speed, high revolution-per-minute (RPM) generators. The PPU 302 distributes electricity from battery bank 304 to the aircraft electrical load 212 and to the electric motors 214, 218 and 222 when the demand for electricity exceeds the electricity being produced by generators 204a and 204b such as during high-load maneuvers. The PPU 302 distributes electricity to battery bank 304 for storage when the demand for electricity by the aircraft electric load 212 and electric motors 214,218 and 222 are less than the electricity being produced by generators 204a and 204b such as during low-load maneuvers or cruise. As such, the PPU 302 distribution of electricity to and from battery bank 304 enables the flight control computer (FCC) 208 to smooth out the load on engines 202a and 202b due to the power requirement of rotors 216, 220 and 224 and the aircraft electric load 212. Smoothing out the load on engines 202a and 202b may allow engines 202a and 202b to operate more efficiently.

Embodiments described above enable the vehicle designer to optimize the weight of the system that includes electric motor 214 and speed reduction gearbox 402 to drive main rotor 216, electric motor 218 and speed reduction gearbox 404 to drive tail rotor 220, electric motor(s) 222 and the speed reduction gearbox 406 to drive auxiliary propulsor rotor 224.

Similar to the embodiment shown and described in FIG. 3, the electrified propulsion system 400 includes a FCC 208 that is in communication with an engine control systems (ECS) 206a and 206b for engines 202a and 202b respectively. The FCC 208 receives commands from the pilot interface and from other vehicle electric loads to provide electric power to the motors 214, 218 and 222 and will therefore send commands to ECSs 206a and 206b to provide power and to the PPU 302 to distribute electricity. In an embodiment, the FCC 208 may include a vehicle management system (VMS) and a health usage monitoring system (HUMS). The HUMS collects operational flight data utilizing on-board accelerometers, sensors, and avionics systems in order to monitor the health of components on the electrified rotary wing aircraft 100 (See FIG. 1). The FCC 208 and the PPU 302 may each include memory to store instructions that is executed by a processor. The executable instructions may be stored or organized in any manner and at any level of abstraction, such as in connection with managing the power flow through the electrified propulsion system 400. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored the data and control algorithms for controlling the internal combustion engines 202a-202b, the electric motors 214, 218, 222, and other operational data for the electrified rotary wing aircraft 100 (See FIG. 1).

Figure 5:
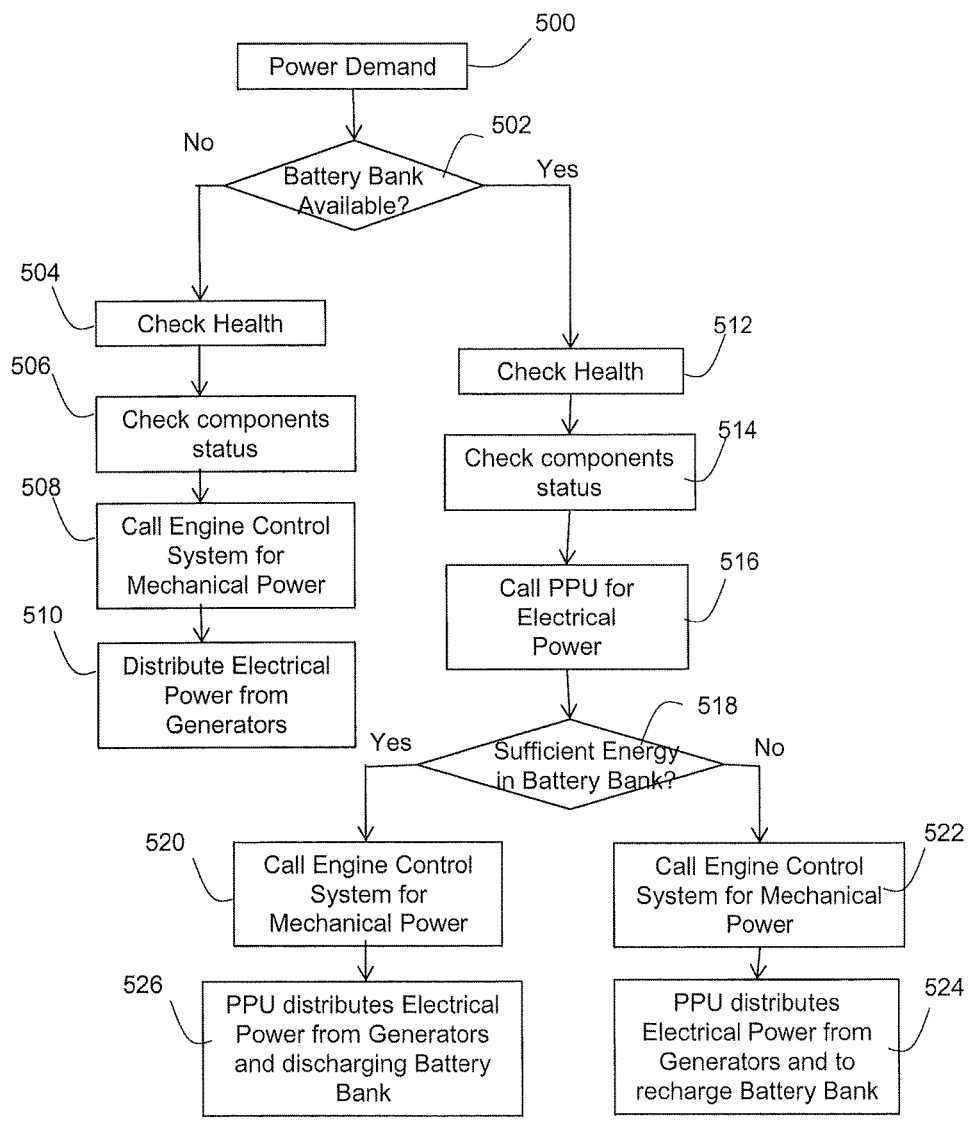
FIG. 5 is an exemplary flowchart of providing power to a rotary wing aircraft according to an embodiment.

FIG. 5 is a flowchart of an exemplary process executed by the Flight Control Computer (FCC) 208 to manage electrical power in electrified rotary wing aircraft 100. The process begins at 500 where the FCC 208 detects the power demand. This power demand may originate in response to a pilot command or a detected condition by the FCC 208 such as, for example, a high power demand during a maneuver, etc. The power demand may also originate from the Vehicle Management System or the Health and Usage Monitoring System, which are both in electrical communication with the Flight Control Computer 208 and the system components such as, in one embodiment, a Battery Bank 304 if present on the rotorcraft 100.

At 502, if a Battery Bank 304 is not present on rotorcraft 100, then at 504 the FCC 208 communicates with vehicle Health and Usage Monitoring System to determine if there are any system components or conditions that may interfere with the call for electrical energy. For example, the vehicle Health and Usage Monitoring System may indicate that a fuel delivery module to the engine is experiencing control errors, indicating that increased engine power may not be appropriate at this time. Alternatively, there may be a fault in the aircraft's Electrical Load 212.

At 506, the Flight Control Computer 208 detects status of the system components, such as the engines' Engine Control System 206a, 206b such as a Full Authority Engine Digital Controllers (FADEC), Generators 204a, 204b, Main Rotor Electric Motor 214, Tail Rotor Electric Motor 220, the Auxiliary Propulsor Electric Motor 222, Main Rotor Speed Reduction Gearbox 402 (if present on rotorcraft 100), Tail Rotor Speed Reduction Gearbox 404 (if present on rotorcraft 100), and one or more auxiliary propulsor speed reduction gearbox(es) 406 (if present on rotorcraft 100). If the system's health and status are verified, flow continues to 508 where the ECSs are instructed to increase power from Powerplant 202 to drive the Generators 204a, 204b. At 510, electrical power from the Generators 204a, 204b is then sent directly to one or all of the following to satisfy the demand for electrical power initiated at 500: the Main Rotor Electric Motor 214, Tail Rotor Electric Motor 220, the Auxiliary Propulsor(s) Electric Motor(s) 222, and/or the aircraft's Electrical Load 212.

Alternatively, at 502, if the rotorcraft 100 utilizes a Battery Bank 304 to store excess electrical energy, then flow proceeds to 512 where the FCC communicates with vehicle Health and Usage Monitoring System to determine if there are any system components or conditions that may interfere with the call for electrical energy. For example, the vehicle Health and Usage Monitoring System may indicate that a fuel delivery module to the engine is experiencing control errors, indicating that increased engine power may not be appropriate at this time. Or, there may be a fault in the aircraft's Electrical Load 212.

At 514, the FCC 208 also detects a status of the system components, such as the Battery Bank's 304 health/charge, Power Processing Unit 302, the engine control system 206a, 206b, Generators 204a, 204b, Main Rotor Electric Motor 214, Tail Rotor Electric Motor 220, the Auxiliary Propulsor Electric Motor 222, Main Rotor Speed Reduction Gearbox 402 (if present on rotorcraft 100), Tail Rotor Speed Reduction Gearbox 404 (if present on rotorcraft 100), and one or more auxiliary propulsor Speed Reduction Gearboxes 406 (if present on rotorcraft 100).

If the system's health and status are verified, flow continues to 516, where the Power Processing Unit 302 is instructed to manage and distribute electrical energy. The Power Processing Unit 302, in communication with the Vehicle Management System and the Health and Usage Monitoring System determines if the Battery Bank 304 has sufficient stored energy at 518.

If there is sufficient stored energy at 518, flow continues to 520 where the Power Processing Unit 302 calls ECSs 206a, 206b to command the Powerplant 202 to provide mechanical power to drive the Generators 204a, 204b. The Generators 204a, 204b then supply electrical power to the Power Processing Unit 302.

At 526, the Power Processing Unit 302 distributes electrical power discharged from the Battery Bank 304 and from generators 204a and 204b to one or any variety of the following to satisfy the demand for electrical power initiated at 500: the Main Rotor Electric Motor 214, Tail Rotor Electric Motor 220, Auxiliary Propulsor Electric Motor 222, the aircraft's Electrical Load 212, and to recharge the Battery Bank 304.

If there is not sufficient stored energy at 518, flow continues to 522 where the Power Processing Unit 302 calls ECSs 206a, 206b to command the Powerplant 202 to provide mechanical power to drive the Generators 204a, 204b. The Generators 204a, 204b then supply electrical power to the Power Processing Unit 302.

At 524, the Power Processing Unit 302 distributes electrical power to one or any variety of the following to satisfy the demand for electrical power initiated at 500: the Main Rotor Electric Motor 214, Tail Rotor Electric Motor 220, Auxiliary Propulsor Electric Motor(s) 222, the aircraft's Electrical Load 212, and to recharge the Battery Bank 304.

The terminology used herein is for the purpose of describing particular embodiments only and is not intended to be limiting. While the description of the embodiments has been presented for purposes of illustration and description, it is not intended to be exhaustive or limited to the embodiments in the form disclosed. Many modifications, variations, alterations, substitutions, or equivalent arrangement not hereto described will be apparent to those of ordinary skill in the art without departing from the scope and spirit of the disclosure. Additionally, while various embodiment have been described, it is to be understood that aspects of the disclosure may include only some of the described embodiments. Accordingly, the disclosure is not to be seen as limited by the foregoing description, but is only limited by the scope of the appended claims.

What is claimed is:

1. An rotary wing aircraft, comprising:
    an airframe;
    a main rotor located at an upper portion of the airframe;
    a tail rotor positioned at a rear portion of the airframe;
    an engine; and
    an electrified propulsion system comprising:
        an engine control system that is in communication with the engine and is configured to control operation of the engine;
        a generator that is in mechanical communication with the engine receives mechanical power from the engine and converts the mechanical power to electrical power;
        a first electric motor in electrical communication with the generator and configured to receive electric power from the generator to drive rotation of the main rotor;
        a second electric motor in electrical communication with the generator and configured to receive electric power from the generator to drive rotation of the tail rotor;
        a battery operably coupled to the generator and at least one of the first motor and the second motor;
        a power processing unit electrically connected with the generator, the first motor, the second motor, and the battery, wherein the power processing unit receives electrical power from the generator and distributes the electrical power to at least one of the first electric motor, the second electric motor; and
        a flight control computer arranged in communication with the engine control system, the flight control computer including a health and usage monitoring system operable to determine if there are any system components or conditions that interfere with providing electrical power to one of the main rotor and the tail rotor, and in response to verification of a health and status of the system components or conditions, the flight control computer is operable to command the engine control system to provide power and operable to command the power processing unit to distribute electrical power.

2. The electrified propulsion system of claim 1, wherein the power processing unit is in communication with the battery and an aircraft electrical load, wherein the power processing unit is configured to regulate the electric power that is supplied to the electric motor in response to the power demand and the selected operating point.

3. The electrified propulsion system of claim 2, wherein the power processing unit is configured to regulate the electrical power to the battery and configured to regulate the electrical power from the battery, wherein the power processing unit regulates the electrical power in response to the power demand.

4. The electrified propulsion system of claim 1, wherein the battery is configured to supply stored electrical power to the electric motor in response to a high power demand and the selected operating point.

5. The electrified propulsion system of claim 1, wherein the battery is configured to supply stored electrical power to the aircraft electrical load in response to a high power demand and the selected operating point.

6. The electrified propulsion system of claim 1, wherein the system further comprises a third electric motor for operating an auxiliary propulsor.

7. The electrified propulsion system of claim 1, further comprising:
    another speed reduction gearbox arranged in mechanical communication with the other of the main rotor and the tail rotor for driving the other of the main rotor and the tail rotor about another axis, the another speed reduction gearbox being a parallel axis gearbox.

8. The electrified propulsion system of claim 7, wherein the another speed reduction gearbox is a parallel axis gearbox.

9. The electrified propulsion system of claim 6, further comprising:
    an auxiliary propulsor rotor that is in mechanical communication with the auxiliary propulsor electric motor, wherein the auxiliary propulsor electric motor is configured to receive the electric power from the generator and drive mechanical rotation of the auxiliary propulsor rotor.

10. The electrified propulsion system of claim 9, further comprising:
    a speed reduction gearbox in mechanical communication with the auxiliary propulsor rotor, wherein the speed reduction gearbox receives mechanical power from the auxiliary propulsor electric motor and drive the mechanical rotation of the auxiliary propulsor rotor.

\* \* \* \* \*